(12) United States Patent
Burns

(10) Patent No.: US 9,880,723 B2
(45) Date of Patent: Jan. 30, 2018

(54) GRAPHICAL USER INTERFACE USING COLOR SPECTRUM TO MAP SENTIMENTS

(71) Applicant: SPKDRM LLC, Redwood City, CA (US)

(72) Inventor: Joel Thomas Burns, Woodside, CA (US)

(73) Assignee: SPKDRM LLC, Redwood City, CA (US)

( * ) Notice: Subject to any disclaimer, the term of this patent is extended or adjusted under 35 U.S.C. 154(b) by 281 days.

(21) Appl. No.: 14/676,995

(22) Filed: Apr. 2, 2015

(65) Prior Publication Data

US 2016/0283093 A1    Sep. 29, 2016

Related U.S. Application Data

(63) Continuation-in-part of application No. 29/522,055, filed on Mar. 27, 2015, now Pat. No. Des. 777,179.

(51) Int. Cl.
| | | |
|---|---|---|
| *G06F 3/0484* | (2013.01) | |
| *G06T 11/00* | (2006.01) | |
| *G06Q 30/00* | (2012.01) | |
| *G06F 3/0482* | (2013.01) | |

(52) U.S. Cl.
CPC ........ *G06F 3/04847* (2013.01); *G06F 3/0482* (2013.01); *G06F 3/04842* (2013.01); *G06Q 30/00* (2013.01); *G06T 11/001* (2013.01)

(58) Field of Classification Search
CPC ............... G06F 3/04847; G06F 3/0482; G06F 3/04842; G06T 11/001; G09G 5/02; G06Q 30/00
See application file for complete search history.

(56) References Cited

U.S. PATENT DOCUMENTS

| | | | | |
|---|---|---|---|---|
| 5,377,024 A | * | 12/1994 | Dillinger | H04N 1/52 347/43 |
| 5,508,718 A | * | 4/1996 | Haikin | G06T 11/001 345/601 |
| 2002/0177756 A1 | * | 11/2002 | Pierre Godinot | A61B 5/00 600/300 |
| 2009/0031882 A1 | * | 2/2009 | Kemp | G06F 17/30743 84/609 |
| 2010/0050118 A1 | * | 2/2010 | Chowdhury | G06F 3/0482 715/810 |
| 2011/0252344 A1 | * | 10/2011 | van Os | G06F 9/4443 715/763 |
| 2012/0047447 A1 | * | 2/2012 | Haq | G06F 3/04847 715/752 |

(Continued)

*Primary Examiner* — Andrew Tank
(74) *Attorney, Agent, or Firm* — Nixon Peabody LLP; Justin D. Swindells

(57) ABSTRACT

Systems and methods of operating a human-machine interface (HMI) with a graphical user interface (GUI). A color spectrum is displayed along with a topic. A selection of a point on the color spectrum is received, and associated in a memory with the displayed topic. A data record is stored indicating a sentiment associated with the topic. The sentiment includes an intensity level and an emotion level. The intensity level is one of multiple intensity levels that change along a first dimension of the color spectrum, and the emotion level is one of multiple emotion levels that change along a second dimension of the color spectrum.

12 Claims, 10 Drawing Sheets
(8 of 10 Drawing Sheet(s) Filed in Color)

(56) References Cited

U.S. PATENT DOCUMENTS

| | | | |
|---|---|---|---|
| 2012/0096380 A1* | 4/2012 | Wagner | G06F 3/04847 |
| | | | 715/771 |
| 2012/0209793 A1* | 8/2012 | Morris | G06F 17/30967 |
| | | | 706/11 |
| 2013/0178962 A1* | 7/2013 | DiMaria | G06F 17/30038 |
| | | | 700/94 |
| 2014/0215351 A1* | 7/2014 | Gansca | G06Q 50/01 |
| | | | 715/751 |
| 2014/0258170 A1* | 9/2014 | Biscoe | G06Q 30/0282 |
| | | | 705/347 |
| 2014/0267367 A1* | 9/2014 | Chong | G06T 11/001 |
| | | | 345/595 |
| 2014/0278786 A1* | 9/2014 | Liu-Qiu-Yan | G06Q 30/0201 |
| | | | 705/7.32 |
| 2015/0213002 A1* | 7/2015 | Gou | G06F 17/2785 |
| | | | 704/9 |
| 2016/0371350 A1* | 12/2016 | Hao | G06F 17/3053 |

* cited by examiner

GRAPHICAL USER INTERFACE USING COLOR SPECTRUM TO MAP SENTIMENTS

FIELD OF THE INVENTION

The present disclosure relates to a human-machine interface with a graphical user interface, and more particularly, to a graphical user interface that displays a color spectrum.

BACKGROUND

A human-computer interface enables humans to interact with a computer. The interface can take the form of a graphical user interface (GUI) that displays, typically on an electronic video display, visual information to the human user. The human user can make inputs to the computer and thereby translate an intended action by the human user into a machine-language command that the computer understands and can carry out. Simultaneously with a human input or responsive to a human input, additional graphical information can be displayed on the GUI. A technical challenge is conveying information in a meaningful way to the human user so that the inputs to the computer accurately reflect the information sought. For example, capturing subjective human sentiment in a machine is only as good as the quality of the information presented to the human user. If the feeling or sentiment can be captured in a way that is intuitive to the human user, the inputs entered to the computer will be more accurate and representative of the actual sentiment that the human user wants to convey. Aspects of the present disclosure address these and other technical challenges.

BRIEF SUMMARY

According to an aspect of the present disclosure, a method is disclosed of operating a human-machine interface (HMI) with a graphical user interface (GUI). The method includes: displaying on an electronic video display a color spectrum forming a color space; displaying on the electronic video display a topic; repeating, one or more times, for the topic or for a multitude of topics: receiving, via an electronic input interface device, a selection of a point or area on the color spectrum; determining automatically from the received selection, using one or more computers, a digital representation of a color corresponding to the selected point or area in the color space of the color spectrum; associating in an electronic memory device the digital representation with the topic or one of the multitude of topics; and storing in the electronic memory device an electronic data record indicating a sentiment associated with the topic or with the one of the multitude of topics. The sentiment includes an intensity level and an emotion level. The intensity level is one of a plurality of intensity levels that change along a first dimension of the color spectrum. The emotion level is one of a multitude of emotion levels that change along a second dimension of the color spectrum.

The method can further include forming the color spectrum by: producing, using at least one of the one or more computers, an undistorted color spectrum defined by at least two Cartesian axes having a spectrum of colors starting from violet to red, or vice versa and forming an RGB color space; distorting, using the at least one of the one or more computers, the undistorted color spectrum by converting the at least two Cartesian axes to a polar coordinate system to produce a distorted color spectrum; and transforming, using the at least one of the one or more computers the RGB color space into an other color space other than the RGB color space, where the other color space is a hue-saturation-brightness (HSB) color space or a hue-saturation-lightness (HSL) or a hue-saturation-value (HSV) color space or a hue-saturation-intensity (HSI) color space so that a brightness or a lightness or an intensity of color decreases away from a pole of the polar coordinate system to produce the color spectrum displayed on the electronic video display device, so that the brightness or the lightness or the intensity of the color is commensurate with an intensity of the emotion level to define the multitude of intensity levels, and wherein an increasing wavelength of the color corresponds to an increasing level of emotion to define the multitude of emotion levels.

The step of repeating can be carried out multiple times such that the storing results in storing electronic data records in the electronic memory device. The electronic data records can form a digital fingerprint associated with an electronic user account that includes at least one characteristic associated with a human user.

The color space can be a hue-saturation-brightness (HSB) color space or a hue-saturation-lightness (HSL) or a hue-saturation-value (HSV) color space or a hue-saturation-intensity (HSI) color space. The sentiment can be indicated by a combination of the selected color together with the selected brightness or lightness or saturation value or intensity on the color spectrum. The color space can be a representation of points in a color model based on an RGB color model.

The color spectrum can have an upper boundary and an opposing lower boundary and a first edge and an opposing second edge. A color brightness, a color lightness, or a color intensity can decrease from the upper boundary toward the lower boundary. The intensity levels can range from low to high. The first dimension can be a y-axis dimension of the color spectrum, and the second dimension can be an x-axis dimension of the color spectrum.

The emotion levels can range from cold to medium to hot or from hate to indifferent to love or from no to maybe to yes or from negative to neutral to positive. The selected color can be represented by component values. The electronic data record can include the component values.

The step of receiving the selection can include: detecting a human-machine interaction via the electronic input interface device; and while the detecting continues to detect the human-machine interaction, displaying on the electronic video device a lens feature that enlarges an area of the color spectrum corresponding to the detecting. The interaction can include a touch or a gesture relative to the electronic input interface device. The electronic input interface device can include a touch-sensitive surface. The selection can be received by detecting a release or a loss of the touch or the gesture relative to the electronic input interface device.

The method can further include, responsive to the receiving the selection, displaying on the electronic video display a graphical element that includes the same color as the color corresponding to the selected point or area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
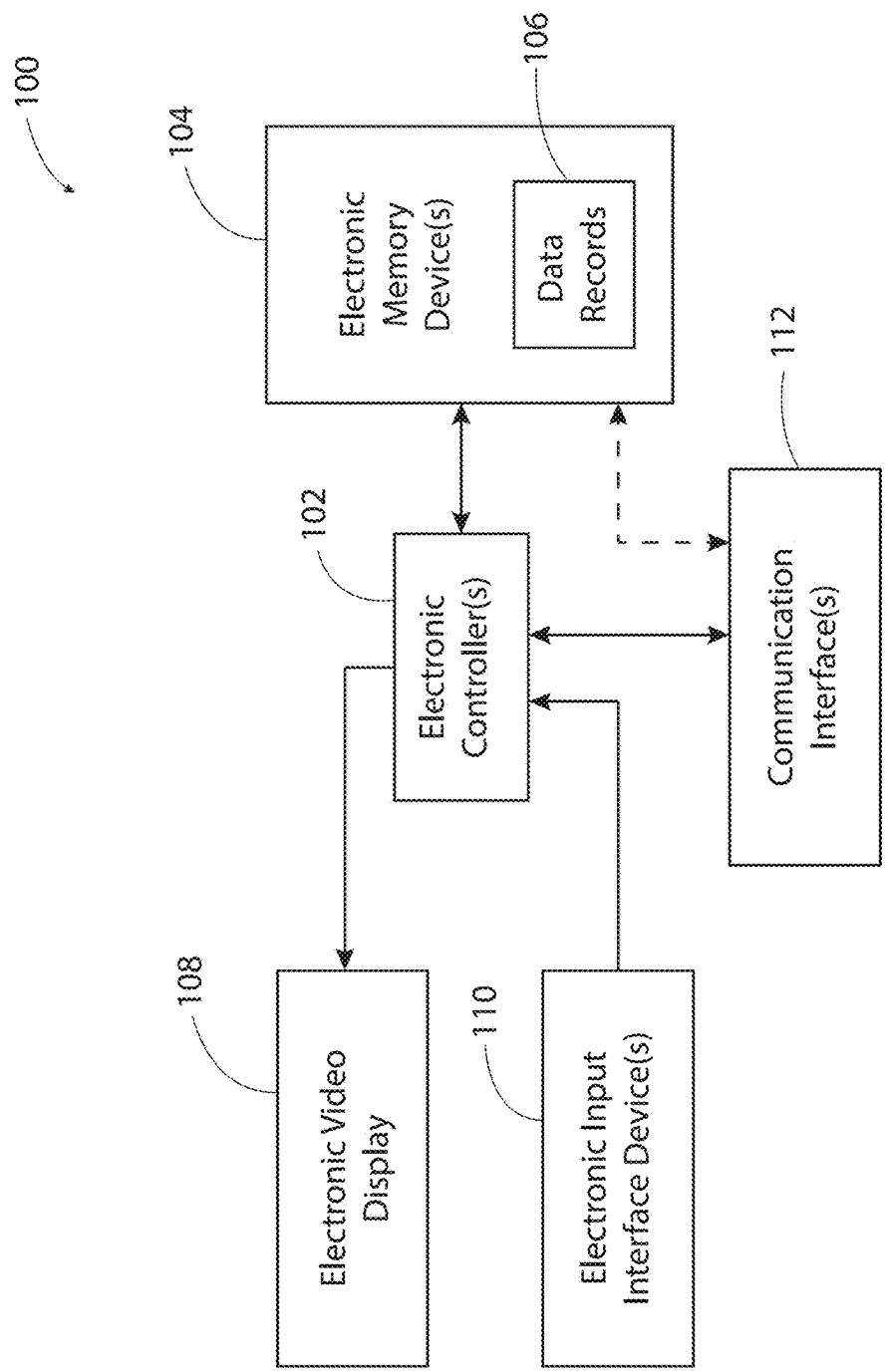
FIG. 1 is a functional block diagram of a system that can be used to implement the aspects disclosed herein.

A functional block diagram of an electronic system 100 that includes various electronic components or devices (hereafter "system") is shown in FIG. 1. The system 100 can be a computer as that term is understood in the computer arts. A "computer" as used herein in the singular or plural form can refer to one or multiple computer devices (e.g., each computer device can be housed in separate physical housings) operably coupled together to communicate information among each other. In its most basic form, a computer includes at least one electronic controller, as that term is understood in the computer arts. Thus, the system 100 includes one or more electronic controllers 102 (hereafter "controller"). The system 100 includes one or more electronic memory devices 104 (hereafter "memory"). Electronic data records 106 (hereafter "data records") are stored in the memory. Video data stored in the memory 104 is conveyed, such as by a video controller, which can be one of the electronic controllers 102, to one or more electronic video displays 108 (hereafter "video display") operably coupled to the controller 102. Inputs from a human user interacting with the system 100 can be received from one or more electronic input interface devices 110. Data or other information in digital or analog form can be communicated relative to systems external to the system 100 via one or more communication interfaces 112.

Examples of input interface devices 110 include a touch-screen or touch-sensitive substrate, a camera, an electronic keyboard, a mouse as that term is understood in the computer arts, or any sensor system configured to sense inputs made by a human user interacting with the system 100. In the example described herein, the input interface device 110 can be a touchscreen that overlays the video display 108. At least part of the system 100 can include a so-called smartphone or smartwatch or other wearable computing device, a computer tablet, a laptop, a personal computer, or the like. Examples of communication interfaces 112 include a wired network interface or a wireless network interface. The data records 106 in the memory device 104 are not necessarily stored inside the same housing as the video display 108. For example, the data records 106 can be stored on a computer server remote from the controller 102 as shown by the dashed line in FIG. 1.

Figure 2:
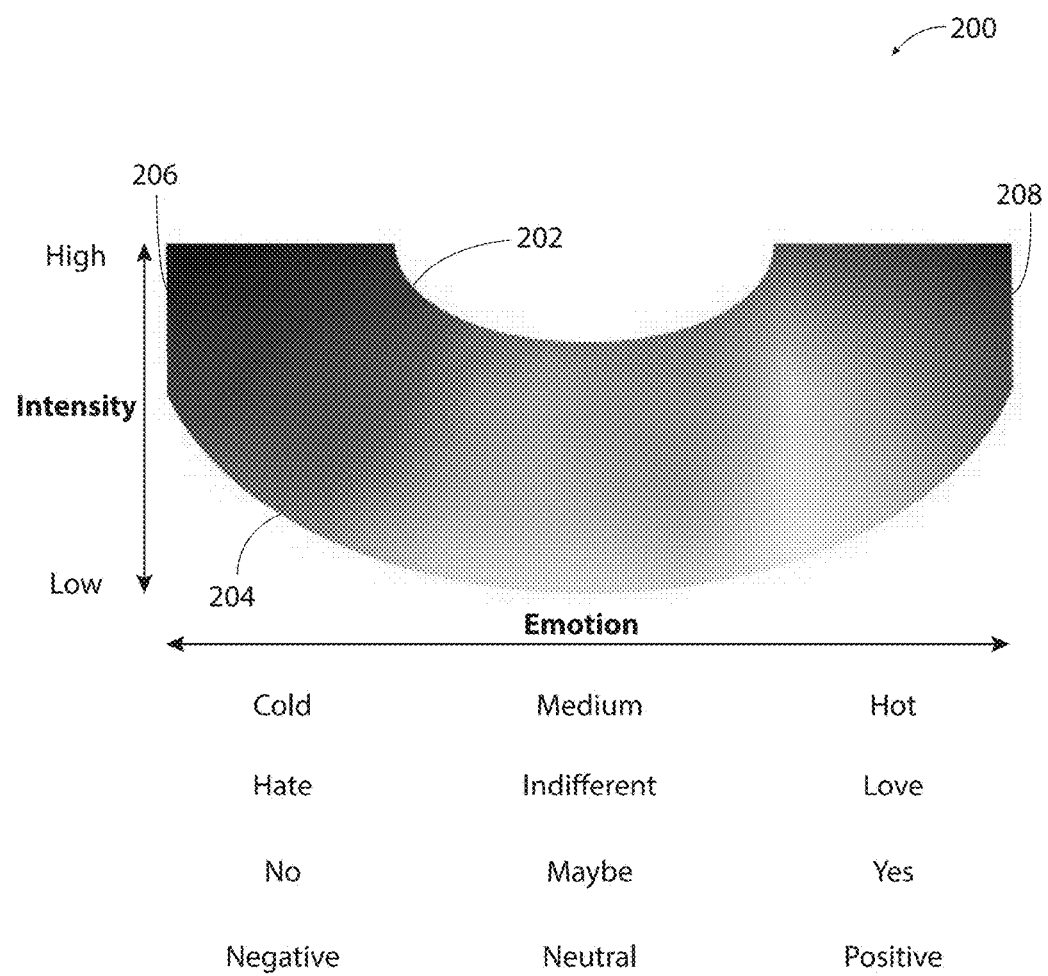
FIG. 2 is an example color spectrum that can be displayed on a graphical user interface.

The system 100 operates a human-machine interface (HMI) with a graphical user interface (GUI). Also described herein are methods of operating a HMI with a GUI. The terms human-machine interface and human-computer interface are interchangeable herein. FIG. 2 shows in color a visible color spectrum 200 forming a color space, which is displayed on the video display 108. In this example, low wavelength colors (e.g., starting with violet) on the visible (e.g., visible to the human eye) spectrum appear on the left side of the color spectrum 200, and the color wavelength increases toward the right of the color spectrum, e.g., until red, the upper range of the visible color spectrum. The color spectrum 200 has been distorted, as explained below.

To create the color spectrum 200, an undistorted color spectrum is produced, which is defined by at least two Cartesian axes (e.g., x and y) having a spectrum of colors starting from violet to red (e.g., an lower visible color wavelength to an upper visible color wavelength), or vice versa and forming an RGB (red-green-blue) color space. Initially, the undistorted color spectrum has a rectangular shape. However, as will be discussed herein, to capture two dimensions of human sentiment, e.g., emotion and intensity, color wavelength alone is not sufficient. Once the undistorted color spectrum has been produced, it is distorted by converting the Cartesian axes (e.g., x and y) to a corresponding polar coordinate system to produce a distorted color spectrum. In this example shown in FIG. 2, the distortion produces a distorted color spectrum that resembles a U-shape. The idea here is that extreme emotions will appear toward the upper "legs" of the U-shape, whereas neutral or less extreme emotions will sag toward the middle of the U-shape. Thus, the shape follows the extremeness of the emotional response. However, as mentioned above, one dimension (wavelength) is not sufficient to capture a two-dimensional human sentiment composed of both emotion and emotional intensity. Thus, the distorted color spectrum is transformed from the RGB space into some other color space other than the RGB color space. Here, the skilled person in computer graphics arts will appreciate that there are any number of color spaces other than RGB to select from. For example, the other color space can be any of a hue-saturation-brightness (HSB) color space or a hue-saturation-lightness (HSL) or a hue-saturation-value (HSV) color space or a hue-saturation-intensity (HSI) color space. The idea here is that a brightness or a lightness or an intensity of color (hereafter, color "intensity" refers to brightness or lightness or intensity of color) decreases away from a pole of the polar coordinate system to produce the color spectrum 200 displayed on the electronic video display device 108. In this way, the color intensity is commensurate with an intensity of the emotion level to define multiple intensity levels (e.g., from top to bottom). At the same time, an increasing color wavelength (e.g., from left to right) corresponds to an increasing level of emotion to define multiple emotion levels. Here again, the color intensity starts high at the top and diminishes toward the bottom of the color spectrum 200. Like the color wavelength, by arranging the color intensity from high to low on the color spectrum 200, where high intensity starts at the upper part of the color spectrum 200 and decreases toward the lower part of the color spectrum 200, the human user can intuit precisely where on the color spectrum 200 to indicate a sentiment.

A sentiment as used herein is a combination of emotion (or feeling) and intensity of that emotion or feeling. The color spectrum 200 allows a user to select a point on the spectrum 200 that represents any sentiment as a function of both emotion and intensity. Intensity can range from high to low with as many subjective levels in between, constrained by the number of pixels in the vertical direction along the color spectrum 200. Emotion level can range from cold to medium to hot, or from hate to indifferent to love, or from no to maybe to yes, or from negative to neutral to positive, and every emotion in between, again constrained by the number of pixels in the horizontal direction along the color spectrum 200. Because emotions or feelings can be expressed in many different words, the examples shown in FIG. 2 are just a few of the many ranges of emotions that can be expressed, and the human user will intuitively understand from the two degrees of freedom of selection on the color spectrum 200 how to express not only an emotion about a topic but also how intensely the user feels about that topic. The broad notion of a "topic" will be discussed in more detail below. As can now be appreciated, the wavelength of the color changes along the horizontal direction of the color spectrum 200, whereas the intensity of the color changes along the vertical direction of the color spectrum 200. The user can now readily perceive from the visual information presented in the color spectrum 200 to indicate a sentiment quickly and intuitively using the color wavelength and intensity, which correlate to emotional level and emotional intensity.

Figure 3:
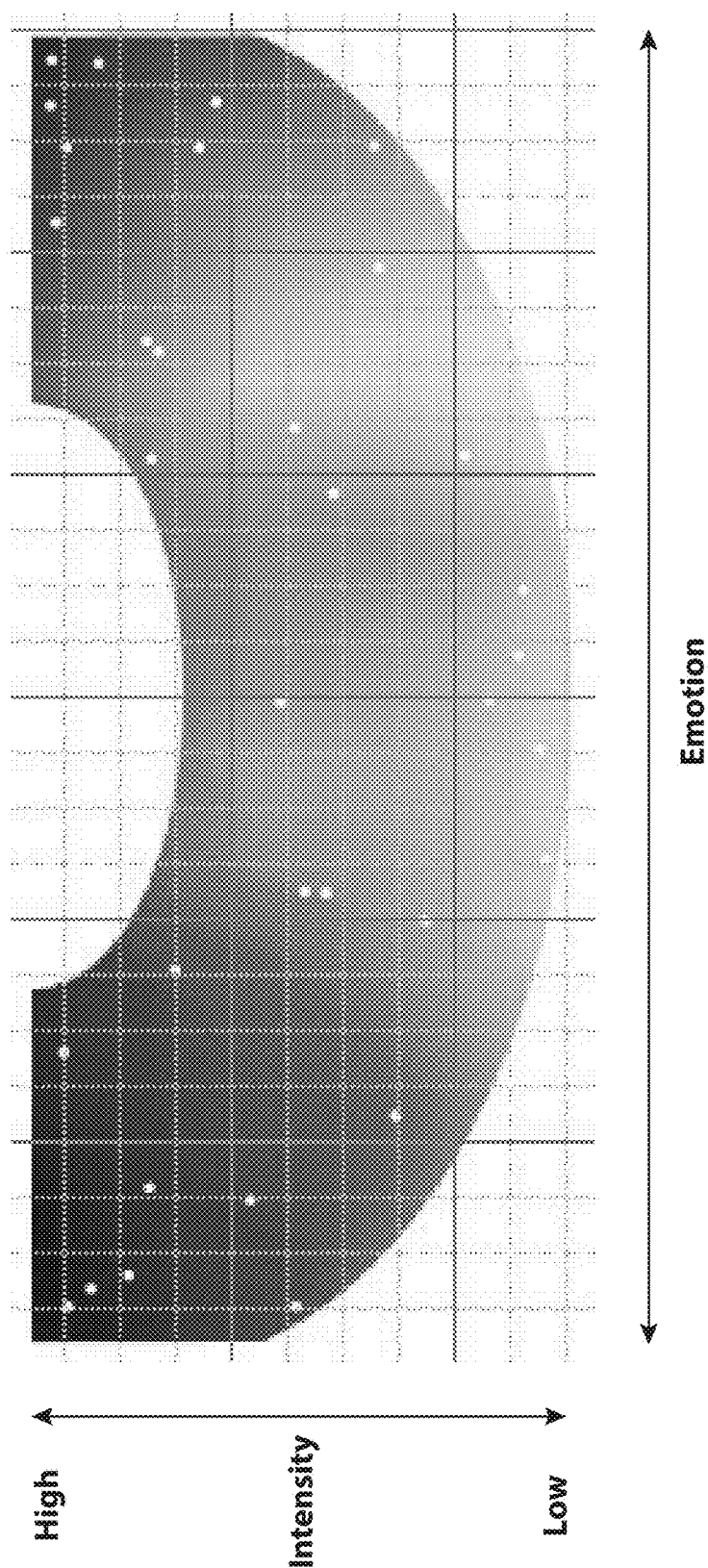
FIG. 3 is an example color spectrum overlaid by a grid that can be used to map coordinate points on the color spectrum.

The color spectrum 200 has an upper boundary 202 and an opposing lower boundary 204, and a first edge 206 and an opposing second edge 208. A color brightness or lightness or intensity decreases from the upper boundary 202 toward the lower boundary 204. A favorability of an emotion increases from the first edge 206 toward the second edge 208. When the color spectrum 200 is expressed in the Cartesian coordinate system, the intensity levels range from low to high along a y-axis dimension of the color spectrum 200, and the emotion levels range from unfavorable to favorable along an x-axis dimension of the color spectrum 200. This coordinate system can be better seen in FIG. 3. For convenience, the skilled person can assign a Cartesian coordinate (x,y) to each selectable point (e.g., having a one-pixel dimension) on the color spectrum 200. Because of the distortion of the color spectrum, the emotion levels are not the same along the vertical direction for any given point. Thus, the Cartesian coordinate mapping takes into account the conversion to polar coordinates when assigning an emotional level and intensity to each pixel on the color spectrum 200. Polar coordinates can also be used instead of Cartesian coordinates, but it can be more convenient to use Cartesian coordinates because the pixels on the video display 108 are also arrayed according to a Cartesian coordinate system.

Figure 4A:
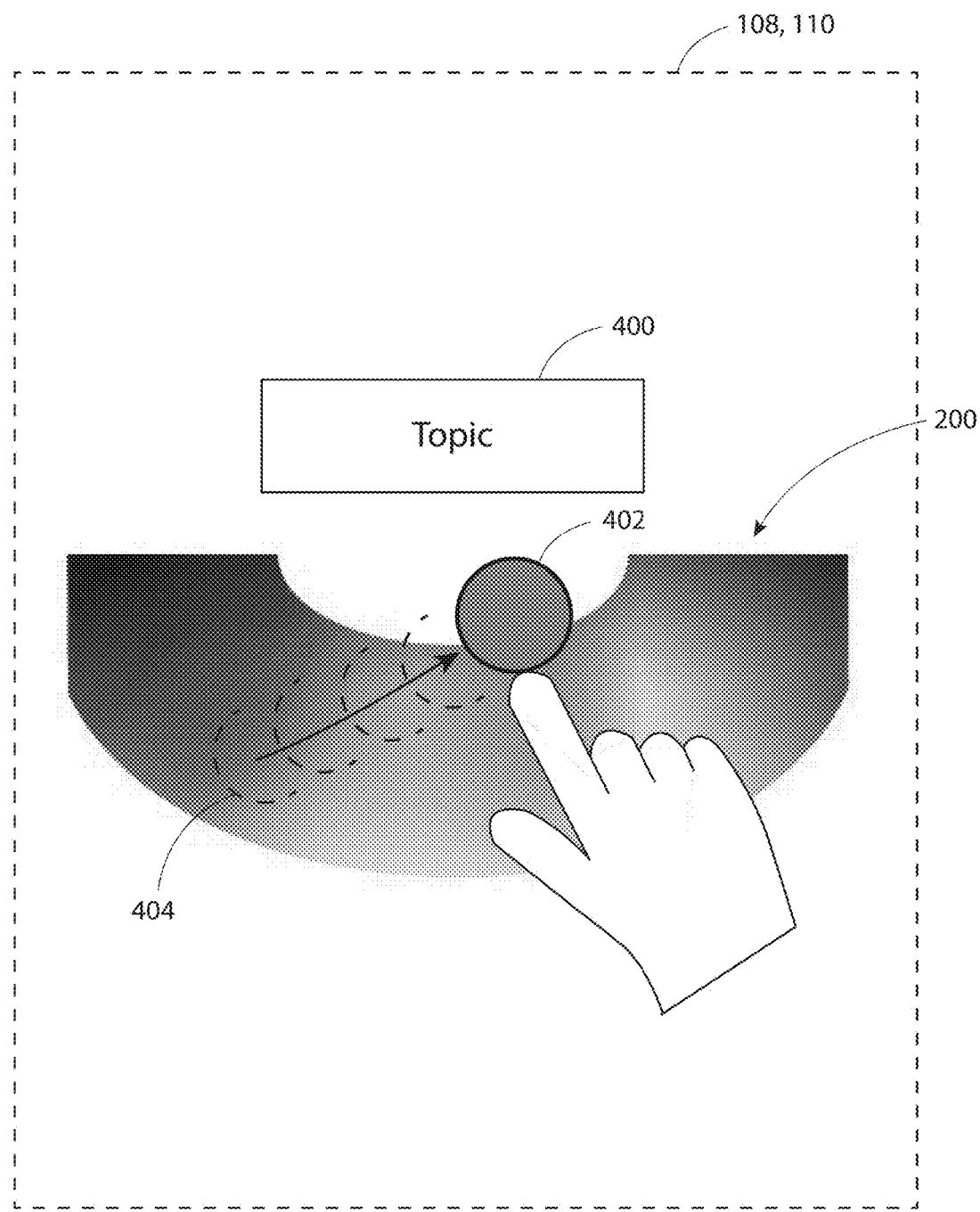
FIG. 4A is an example graphical user interface showing a user interacting with the color spectrum to select a color thereon.
Figure 4B:
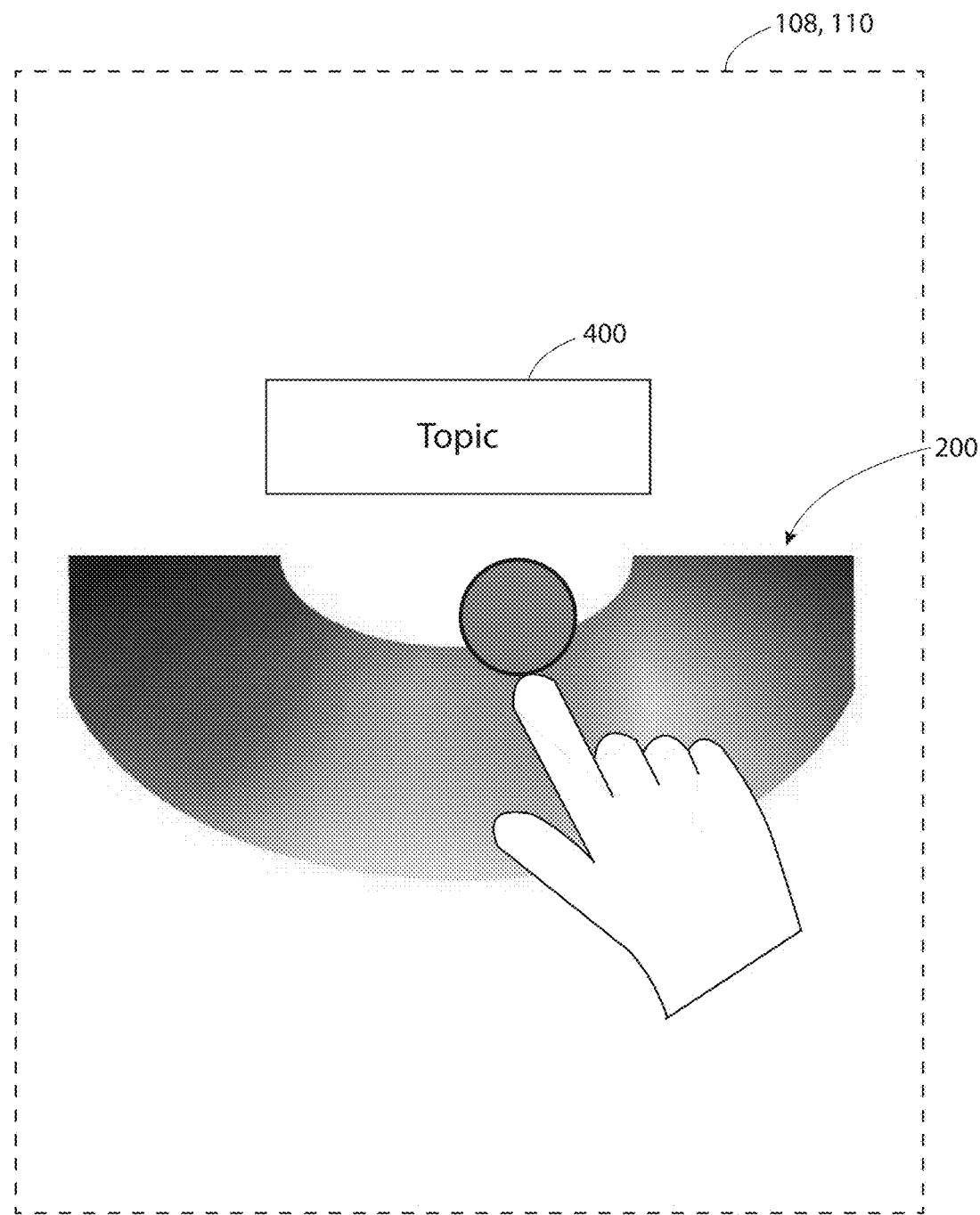
FIG. 4B shows the user about to select a color from the color spectrum shown in the graphical user interface of FIG. 4A.
Figure 4C:
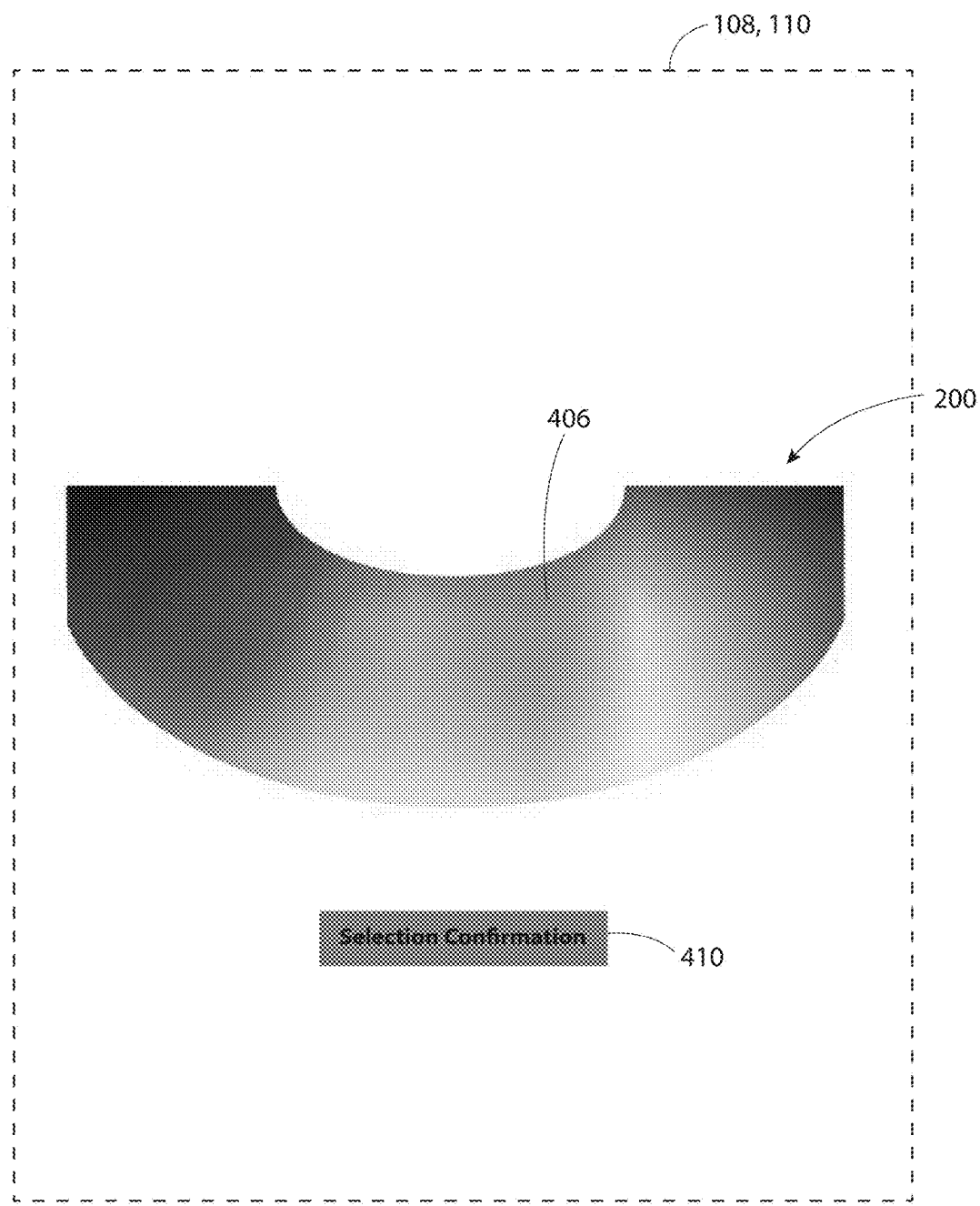
FIG. 4C shows a confirmation of the user's selected color from the graphical user interface shown in FIG. 4B.

FIGS. 4A-4C illustrate an example user input using the color spectrum 200 to indicate a sentiment about a particular topic 400 displayed on the video display 108. The size of the video display 108 here is not intended to be to scale. The color spectrum 200 can be displayed on any size video display 108, constrained only by the desired granularity (e.g., expressed in pixel resolution) of emotion levels and corresponding intensity levels. Here, the user, as indicated by the hand graphic in FIG. 4A, touches the input interface device 110 (such as a touchscreen) at an initial point 404, which causes a lens feature 402 to be displayed on the video display 108 that enlarges an area of the color spectrum 200 corresponding to the touched point on the color spectrum 200. The lens feature 402 follows a gesture made by the user's finger or by a stylus on the input interface device 110, changing colors to match the color of the pixel on the color spectrum 200 where the touch is sensed. The user can continue to maintain physical contact with the touchscreen 110 while moving the finger or stylus around the color spectrum 200. The lens feature 402 changes color as the finger or stylus moves around the color spectrum 200 while touching the touchscreen 110. The lens feature 402 can be a scaled version of the pixel being touched and represented graphically by a bubble or a circle on the video display 108 in the same color as the touched pixel on the color spectrum 200.

What the user is reacting to is the topic 400 that is portrayed on the video display 108. The term "topic" as used herein includes a topic or subject as that term is ordinarily understood and anything else that can be expressed as a sentiment or subjectively rated or scored by a user. The topic 400 can be graphically represented on the video display 108 as a question, for example. For example, a question can be posed as "Where are you on the spectrum of . . . ," and then the topic corresponding to the ellipses can be displayed on the video display 108 below the question. As there are a limitless number and kind of topics as contemplated herein, these following examples are just a very tiny representative sample of topics. For example, the topic 400 can be or can be related to a sport or a sport category, shopping, a game or game category, an activity, politics, fashion, a product or a product category, a current event, policies, a service or a service category, a movie or movie genre, music or music genre, or other personal preferences such as food or food categories or a restaurant or restaurant categories, and so on and so forth. The topic 400 can be displayed graphically as a textual word or phrase, or as a graphical image (e.g., an image of a baseball bat or a dress or a type of food), or as a video. The data structure of a topic in digital form in the memory 104 can include any one or more of an identification value (such as a topic count, which is assigned a value as topics are added), a body (string value), a category (such as in the form of a unique identification corresponding to a distinct category of multiple available categories), a creation date, a status, or an author. After a topic has been answered by the user, the response can be stored as a data record 106 that includes the topic identification value, a coordinate (on the color spectrum 200), and the calendar date the input was made. "Stale" topics that have not been answered in a while (e.g., within 6 months for a first category of topics, or within 1 year for a second category of topics) can be refreshed by re-querying the user to respond to the stale topic again.

In FIG. 4B, the user has decided upon a spot on the spectrum 200 that represents how the user feels about the topic 400 displayed and the intensity of that feeling. To make a selection, the user stops (if moving) and comes to rest at a point on the spectrum 200 (shown in FIG. 4B), and then releases or ceases to touch or contact the input interface device 110 to register a sentiment for the displayed topic 400. As shown in FIG. 4C, a graphical element 410 is displayed on the video display 108 indicating that the selection has been received. In this example, the graphical element 110 includes the same color as the color corresponding to the selected point or area 406 on the color spectrum 200. The optional text "selection confirmation" shown in FIG. 4C does not have to appear with the graphical element 410. This is just to convey that the user is notified that the selection has been registered and recorded. In this example, the use of the same color corresponding to the selected point or area is sufficient to cement the impression in the user that the selection has been received by the system 100.

Figure 5A:
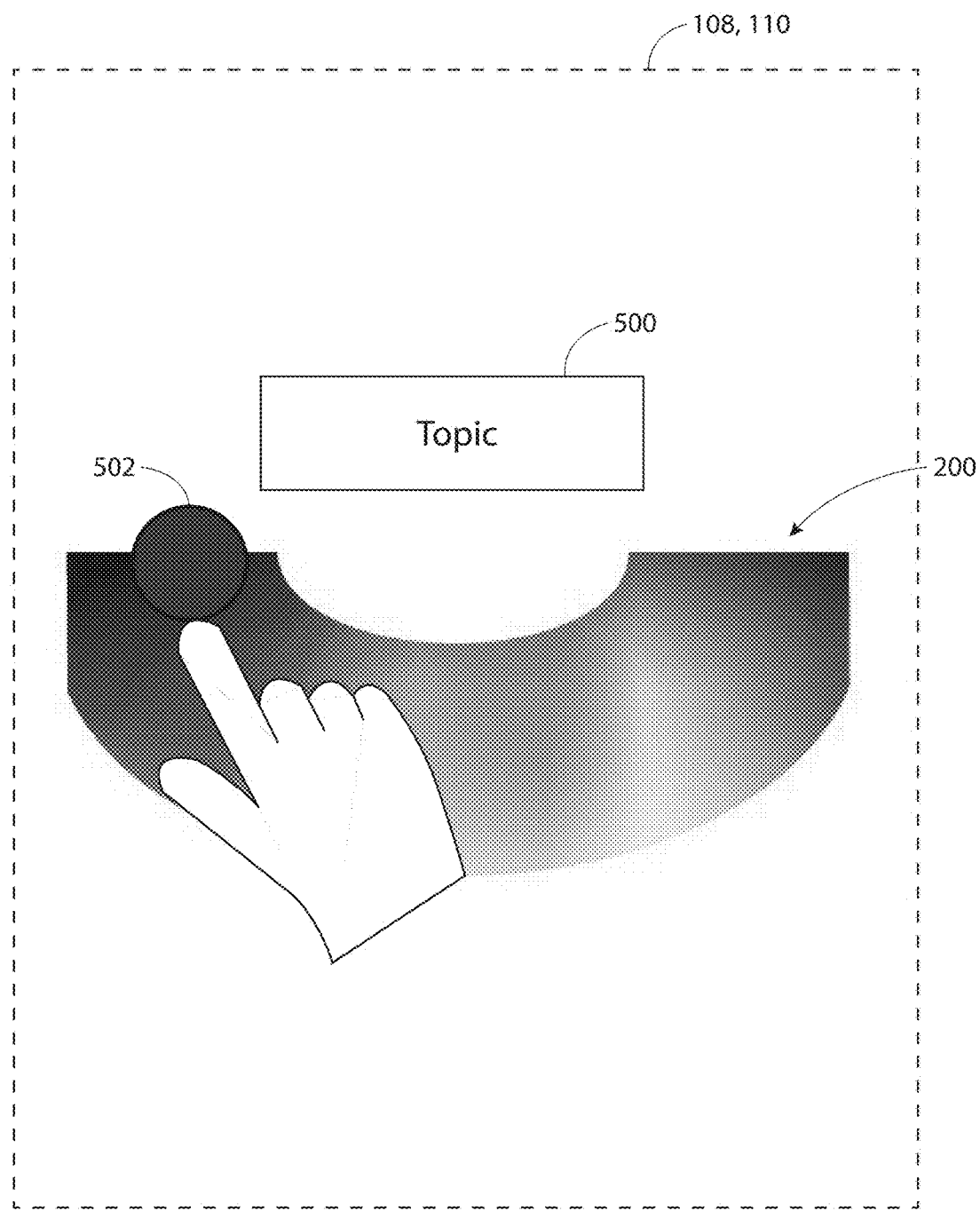
FIG. 5A is another example graphical user interface showing the user interacting with the color spectrum to select a different color thereon.
Figure 5B:
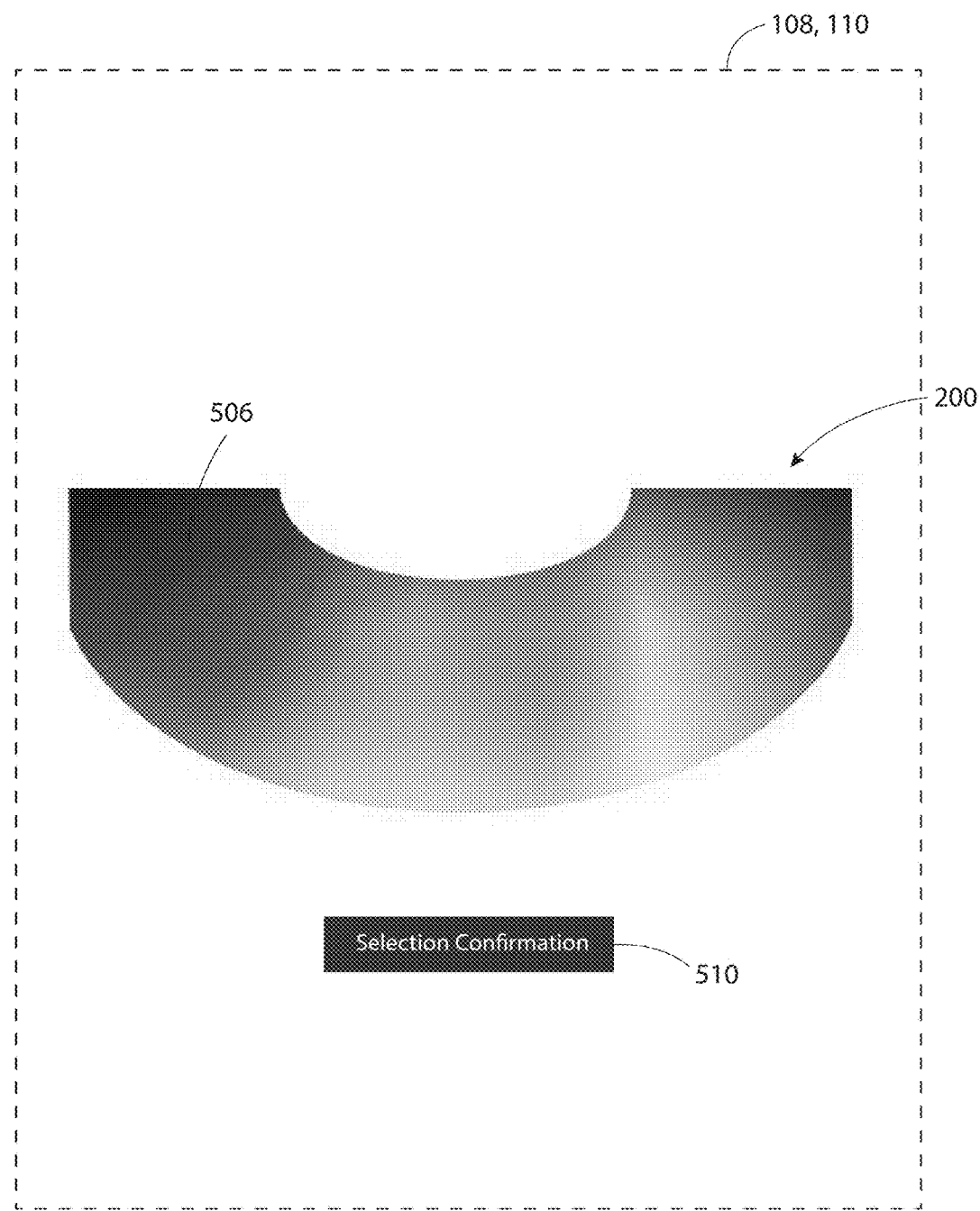
FIG. 5B shows that the user has selected a color on the color spectrum shown in FIG. 5A.

This process of displaying a topic and receiving the user's inputted sentiment on the color spectrum 200 is repeated none, one, or more times, depending on whether and how many further topics are desired to be displayed. FIGS. 5A and 5B illustrate another example selection made by the user using the input interface device 110. Here, a different topic 500 is displayed on the video display 108, which is represented functionally in FIG. 5A as a box with text, but of course can take any visual form described above. In this example, the user has selected a point or area 506 (seen in FIG. 5B) that is enlarged by a lens feature 502 that reflects a lower emotion level compared to the previous selection shown in FIG. 4C. In FIG. 5B, a graphical element 510 appears on the video display 108 once the user has selected the point or area 506 on the color spectrum 200, and the graphical element 510 includes the same color corresponding to the color of the selected point or area 506 on the color spectrum 200.

Figure 6:
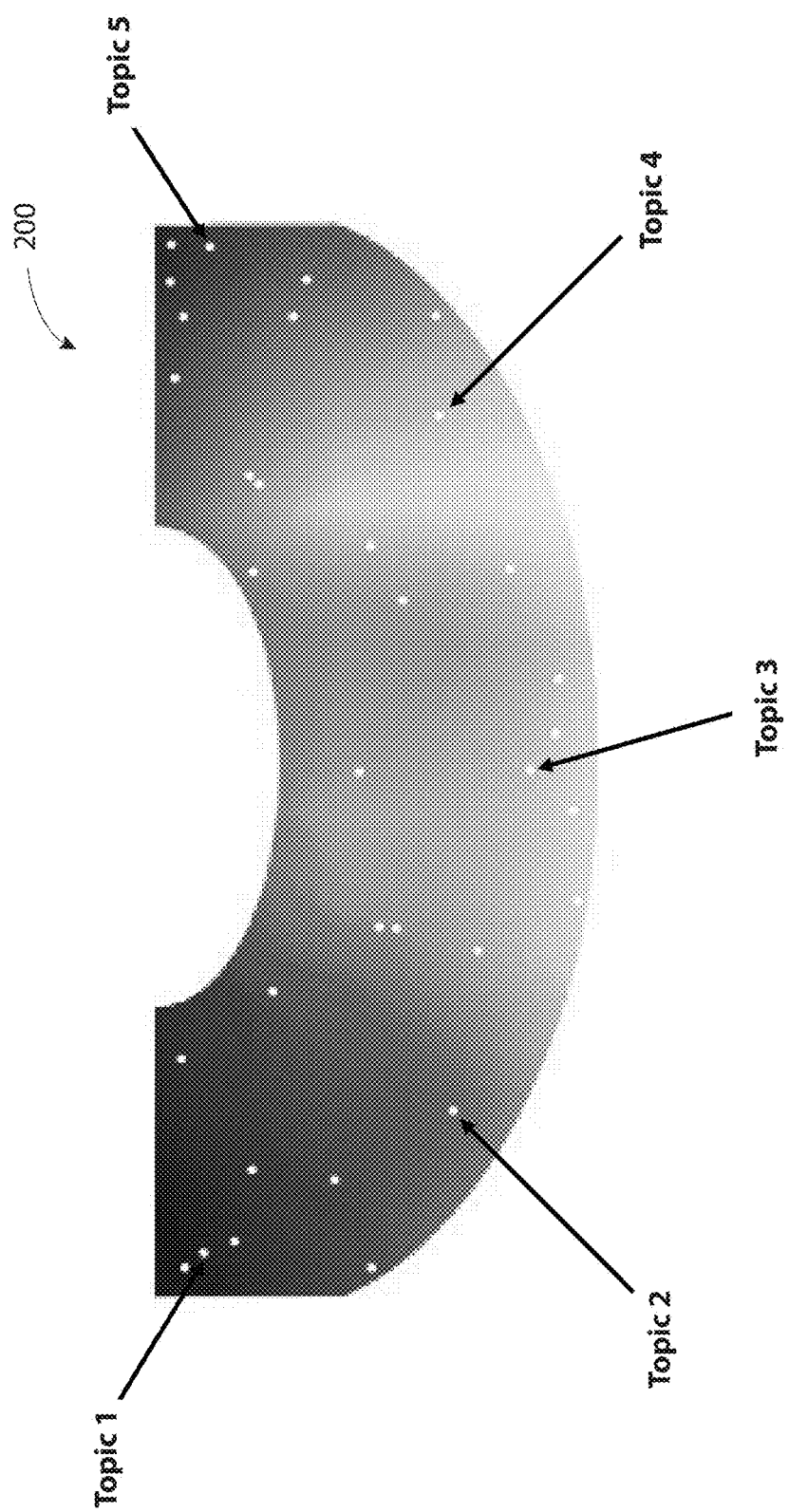
FIG. 6 is a graphical illustration of multiple points selected by the user on the color spectrum, each point being associated with a different topic.

Eventually, as the user inputs more sentiments on various topics, a database of the data records 106 storing topics and the associated inputted sentiments expands for each distinct user of the system 100 or each instantiation of the system 100. Depicted graphically for ease of discussion in FIG. 6, many different sentiments are shown where they would appear on the color spectrum 200. Each white dot represents a different topic and associated sentiment inputted by the user. In the data records 106, these inputs would not be represented graphically, so this graphic is merely for visualization purposes to see how a profile or digital "fingerprint" for a user can become richer as more inputs are made to the system 100. The digital fingerprint can be associated with an electronic user account that includes at least one characteristic associated with a human user. The characteristic can be anonymous, such as the user's age, a unique identification number, gender, age, zipcode, monthly income, or any combination of the foregoing. For example, no personally identifiable information associated with the human user, such as the user's name, date of birth, address, or the like, is stored or retrievable from the digital fingerprint.

The color spectrum 200 can be made to appear on a video display 108 under any number of circumstances. The color spectrum 200 can be a standalone computer program (sometimes colloquially referred to as "app" when running on a mobile computing device or tablet computer), or it can be a widget or other feature that can pop up when another computer program is running or can appear unobtrusively somewhere on the viewable area of the video display in a relatively small footprint. For example, when the user is watching or about to watch a horror movie on a computing device, the color spectrum 200 can pop up with a topic, such as "horror film?" and the user can immediately identify how the user feels about horror films in general as well as how intensely that feeling is for horror films. For another example, when the user is reading a news article on a computing device that relates to a particular topic, such as "global warming," the color spectrum 200 can pop up and display the topic and the user can immediately indicate a sentiment about global warming as the user is reading the article. For another example, when the user is shopping for shoes online while using a computing device, the color spectrum 200 can be displayed for the user to indicate immediately a sentiment about shoes as the user is searching for or about to purchase shoes. For another example, the user can be browsing through photos of a baseball game on a computing device, and the color spectrum 200 can appear with a topic, such as "baseball?," as the user can immediately select a sentiment about baseball as the user is browsing through photos of a baseball game. For another example, the user can be listening to a podcast on a computing device about the stock market, and the color spectrum 200 can display a topic, such as "day trading?," and the user can immediately select a sentiment about day trading without interrupting the podcast while the user continues to listen to the podcast. Other topics can be queried during the same podcast, such as "retirement," or "mutual funds," or "options," for example, to obtain multiple sentiments about multiple topics concerning the same digital content being delivered to the user. The color spectrum 200 can be displayed on social networking websites or applications as well. While some popular social networking sites allow a user to indicate a binary preference (e.g., like or dislike, follow or not), the color spectrum 200 allows the user to express a far more expressive sentiment that truly reflects the user's subjective emotion level and intensity about any given topic. Other rating computer systems allow a computer user to indicate on a linear, uni-dimensional scale a particular preference, such as about a particular movie or song, but the color spectrum herein offers an opportunity for the user far more flexibility, dimensionality, and accuracy in conveying a multi-dimensional sentiment (e.g., emotion+intensity) about the movie or song.

The topics can be displayed in other ways as well. For example, the topic can briefly appear over the color spectrum until the user touches the color spectrum, at which point the topic is made to appear to dim to a phantom image or disappears altogether. The idea here is to make the color spectrum as unobtrusive as possible using as little real estate as possible.

The present invention offers a quick, intuitive mechanism using a color spectrum to capture a wide variety of user's sentiments about an endless array of topics, and store those recorded sentiments and associated topics as data records 106. Because the probability of any two users having exactly the same set of topics and associate sentiments is extremely low, the unique combination of topics and sentiments can be used to form a unique digital fingerprint for each user. For example, a hash value can be created from the topics and sentiments to create a unique identifier for the user, which can be anonymously associated with the user. The digital fingerprint can be used to convey electronically additional content or services to the user that reflect that user's preferences as expressed by the inputted sentiments for various topics. For example, if the user has expressed a very high degree of emotion for dogs and very high intensity of emotion for dogs, an offer for a digital subscription to a dog magazine can be delivered electronically to the user.

Figure 7:
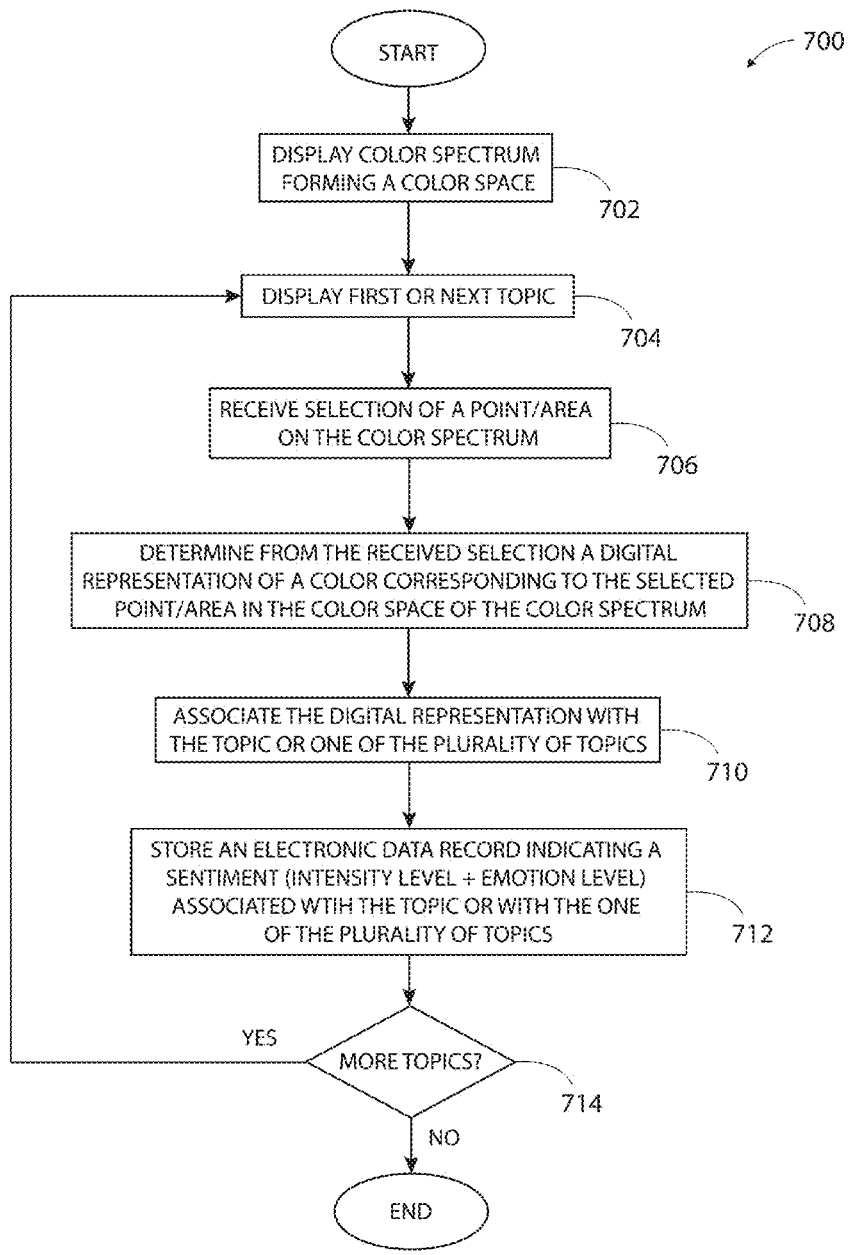
FIG. 7 is a flowchart of an example algorithm that can be used to carry out aspects of the present disclosure.

FIG. 7 illustrates an example flowchart for operating a HMI with a GUI according to an aspect of the present disclosure. The flowchart can be implemented, for example, as a computer algorithm 700 that instructs or causes physical semiconductor transistors to turn on or off in a predefined sequence according to non-transitory, machine-readable instructions stored in the memory 104, which causes the following functions or acts to be carried out. The algorithm 700 displays on the video display 108 a color spectrum 200 forming a color space (702). Regarding, any of the verbs herein that convey what an electronic component does, such as "displays," it is also meant that the action can be caused to be carried out, to avoid any hypertechnical interpretations about which electronic component is actually involved in carrying out the expressed function or action or step. Thus, it could also be said that the algorithm 700 "causes" the color spectrum 200 to be displayed on the video display 108.

The algorithm 700 displays on the electronic video display 108 a topic (704) as described above. If the user does not make a selection within a timer period, such as three seconds, the displayed topic can be made to flash, such as in a red color, to grab the user's attention that the algorithm 700 is awaiting the user's input. A selection of a point or area on the color spectrum is received via an electronic input interface device, such as a touch by the user's finger or a stylus (706). Again, it could also be said that a selection of a point or area is "caused" to be received via the input interface device 706. The term "via" means that the input interface device 706 is involved in the selection. The algorithm 700 receives, via electronic input interface device 110, a selection of a point or area on the color spectrum 200 (706). The selection can have a one-pixel resolution, or can be represented by an area corresponding to multiple pixels. The algorithm 700 determines automatically from the received selection, using one or more computers, a digital representation of a color corresponding to the selected point or area in the color space of the color spectrum 200 (708). The digital representation can be RGB component values in hexadecimal format, such as #RRGGBB, corresponding to the selected point or area.

The algorithm 700 associates the digital representation with the topic or one of multiple topics, and this association is stored in the memory device 104 (710). For example, this association can be made by a software pointer or in a data structure for the user. The data structure includes topics and their corresponding color representations of the touched points or areas on the color spectrum 200. The algorithm 700 stores in the memory device 104 an electronic data record 106 indicating a sentiment associated with the topic or with the one of the multiplicity of topics (712). The sentiment includes an intensity level and an emotion level, and the intensity level is one of multiple intensity levels that change along a first dimension (e.g., y-axis) of the color spectrum 200, and the emotion level is one of multiple emotion levels that change along a second dimension (e.g., x-axis) of the color spectrum 200 (712).

The algorithm 700 determines whether there are more topics on which a user sentiment is requested (714). If not, no further inputs are solicited during this session until another opportunity arises, and a message can be displayed to the user that the user has answered all available topics. When more topics become available, the user will be prompted to respond to any new topics that have not been responded to. Returning to block 714, if there are more topics to be answered, the algorithm 700 returns to block 704 to repeat one or more times receiving inputs and storing associated colors corresponding to the inputted points or areas on the color spectrum 200 as data records 106 in the memory 104 until there are no more topics to display for the session.

What is claimed is:

1. A method of operating a human-machine interface (HMI) with a graphical user interface (GUI), the method comprising:

producing, using one or more computers, a distorted color spectrum from an undistorted color spectrum, defined by at least two Cartesian axes having a spectrum of colors ranging from violet to red, or vice versa and forming an RGB color space, the producing being carried out by:

distorting, using at least one of the one or more computers, the undistorted color spectrum by converting the at least two Cartesian axes to a polar coordinate system to produce the distorted color spectrum, the distorted color spectrum forming a generally U-shape defined by an upper boundary, an opposing lower boundary, a first edge, and a second opposing edge, and transforming, using at least one of the one or more computers, the RGB color space into a second color space, such that (i) a wavelength of the distorted color spectrum changes from the first edge toward the second opposing edge to define a plurality of emotion levels, and (ii) a color intensity or a color brightness or a color lightness of the distorted color spectrum changes from the upper boundary toward the lower boundary to define a plurality of intensity levels, wherein a sentiment is indicated by a combination of one of the plurality of emotion levels together with one of the plurality of intensity levels;

displaying on an electronic video display the distorted color spectrum;

displaying on the electronic video display a topic;

repeating, a plurality of times, for a plurality of topics:

receiving, via an electronic input interface device, a single selection of a point or area on the distorted color spectrum;

determining automatically from the received selection, using at least one of the one or more computers, a digital representation of a color corresponding to the selected point or area in the color space of the distorted color spectrum and the associated sentiment;

associating in an electronic memory device the digital representation and the associated sentiment with a corresponding one of the plurality of topics; and storing in the electronic memory device or an other electronic memory device an electronic data record indicating the sentiment associated with the topic.

2. The method of claim 1, wherein the storing results in storing a plurality of electronic data records in the electronic memory device or the other electronic memory device, the plurality of electronic data records forming a digital fingerprint associated with an electronic user account that includes at least one characteristic associated with a human user.

3. The method of claim 1, wherein the second color space is a hue-saturation-brightness (HSB) color space or a hue-saturation-lightness (HSL) or a hue-saturation-value (HSV) color space or a hue-saturation-intensity (HSI) color space.

4. The method of claim 1, wherein the color space is a representation of points in a color model based on an RGB color model.

5. The method of claim 1, wherein the color brightness, the color lightness, or the color intensity decreases from the upper boundary toward the lower boundary.

6. The method of claim 5, wherein the wavelength of the distorted color spectrum increases from the first edge towards the opposing second edge of the U-shape of the distorted color spectrum.

7. The method of claim 1, wherein the plurality of emotion levels range from cold to medium to hot or from hate to indifferent to love or from no to maybe to yes or from negative to neutral to positive.

8. The method of claim 1, wherein the selected color is represented by a plurality of component values, and the electronic data record includes the plurality of component values.

9. The method of claim 1, wherein the receiving the selection includes:

detecting a human-machine interaction via the electronic input interface device; and while the detecting continues to detect the human-machine interaction, displaying on the electronic video device a lens feature that enlarges an area of the distorted color spectrum corresponding to the detecting.

10. The method of claim 9, wherein the interaction includes a touch or a gesture relative to the electronic input interface device, and wherein the electronic input interface device includes a touch-sensitive surface.

11. The method of claim 10, wherein the selection is received by detecting a release or a loss of the touch or the gesture relative to the electronic input interface device.

12. The method of claim 1, further comprising, responsive to the receiving the selection, displaying on the electronic video display a graphical element that includes the same color as the color corresponding to the selected point or area.

* * * * *